United States Patent
Welch

(10) Patent No.: US 8,768,292 B2
(45) Date of Patent: Jul. 1, 2014

(54) PORTABLE WIRELESS AUTOMOBILE AND PERSONAL EMERGENCY RESPONDER AND MESSENGER SYSTEM AND METHOD

(76) Inventor: Alfonzo Welch, Dallas, TX (US)

( * ) Notice: Subject to any disclaimer, the term of this patent is extended or adjusted under 35 U.S.C. 154(b) by 130 days.

(21) Appl. No.: 13/284,924

(22) Filed: Nov. 1, 2011

(65) Prior Publication Data

US 2013/0109342 A1    May 2, 2013

(51) Int. Cl.
*H04W 4/22* (2009.01)

(52) U.S. Cl.
USPC .............. 455/404.2; 455/521; 455/569.2

(58) Field of Classification Search
USPC ....... 455/521, 221, 418–420, 567, 569.2, 95, 455/99, 238.1, 344, 345, 346
See application file for complete search history.

(56) References Cited

U.S. PATENT DOCUMENTS

| | | | |
|---|---|---|---|
| 5,793,291 A | 8/1998 | Thornton | |
| 6,104,293 A | 8/2000 | Rossi | |
| 6,714,132 B2 | 3/2004 | Edwards et al. | |
| 6,922,154 B2 | 7/2005 | Kraljic et al. | |
| 6,922,622 B2 | 7/2005 | Dulin et al. | |
| 6,930,614 B2 | 8/2005 | Rackham et al. | |
| 7,321,306 B2 | 1/2008 | Lee et al. | |
| 7,348,880 B2 | 3/2008 | Hules et al. | |
| 7,348,889 B2 | 3/2008 | Monzo et al. | |
| 7,489,247 B2 | 2/2009 | Lee et al. | |
| 7,859,413 B2 | 12/2010 | Nguyen | |
| 2003/0122662 A1 | 7/2003 | Quinonez | |
| 2005/0181743 A1 | 8/2005 | Lawson | |
| 2006/0208169 A1* | 9/2006 | Breed et al. | 250/221 |
| 2007/0075574 A1 | 4/2007 | James | |
| 2011/0257973 A1* | 10/2011 | Chutorash et al. | 704/235 |
| 2012/0001463 A1* | 1/2012 | Breed et al. | 297/217.2 |
| 2012/0159220 A1* | 6/2012 | Winkler et al. | 713/323 |

* cited by examiner

*Primary Examiner* — Cong Tran
(74) *Attorney, Agent, or Firm* — Drew Alia, Esq.

(57) ABSTRACT

Devices, systems, and methods for responding to emergency situations of infants, children and pets left unattended in a vehicle. The device comprises a control module for short range RF transmission housed in a lightweight, portable unit plugged into a vehicle accessory power outlet. The system may additionally comprise sensors in communication with the module to detect and trigger alarms, including: when a vehicle has been in a collision; whether a child has climbed out of a car seat while the vehicle is in motion; when the temperature within the vehicle is unsafe; whether an infant has been left unattended in a vehicle; and whether children are playing in a parked vehicle (e.g. trunk) in unsafe temperatures. The portable device may also be configured with an "SOS" button housed within a key fob, wristband, or necklace, to transmit GPS coordinates of the wearer in emergency situations (such as kidnappings).

11 Claims, 4 Drawing Sheets

PORTABLE WIRELESS AUTOMOBILE AND PERSONAL EMERGENCY RESPONDER AND MESSENGER SYSTEM AND METHOD

FIELD OF INVENTION

The present invention relates to emergency situations, such as systems for detecting the presence of infant and/or pet left unattended in an unsafe vehicle, and then for activating alarms and automated systems to protect the safety of these passenger(s).

BACKGROUND OF THE INVENTION

More than one million people are reported missing in the U.S. In cases of abduction, a victim's mobile communications device (i.e. mobile phone) is generally not an effective means to contact emergency responders: it is too large to be undetected and the assailant would readily think to look for one; the victim would not have time to dial once or repeatedly to report the kidnapping; most police jurisdictions in the U.S. do not support 911 text messages; and the mobile device will quickly discharge so that it can no longer be remotely tracked.

Similarly, current products offering "SOS" emergency dialing with global positioning tracking of the user are not enabled for automated SMS text messaging. A victim of a violent crime will not be able to make and receive phone calls and input text messages. Most of these devices also raise concerns of User privacy because their ability to record the movement of a User. And they are constantly powered on when in use; therefore they are required to be constantly recharged via the User connecting to a power supply. This may put the User at unnecessary risk if the battery is low or if the device is forgotten.

Not only are improved alarm devices needed for individuals at risk of being victims of violence and/or accidents, they are also needed to protect infants, small children, and pets left in vehicles unattended. Since 1996, 35 babies die on average each summer in the U.S., and an additional 5000 are seriously injured as a result of being left in a vehicle, especially on a hot day. Additionally, there are an estimated 300 to 400 pets in the U.S. who die yearly from being left in over heated vehicles.

Although a number of systems exist to detect the presence of children and pets left in vehicles, they generally trigger alarms that only an individual near the vehicle would detect (horn beeping, headlights flashing, etc. . . . ). They lack the ability to respond to emergencies wherein the driver is incapacitated (i.e. stroke) or out of hearing range of the alarms.

Therefore there is a need within the art for low power portable devices that will automatically and manually activate a variety of alarms; and that will repeatedly notify emergency responders, friends, and family via wireless means when physically dangerous situations exist, either directly to the User or to others associated with the User (i.e. infants, children and pets left unattended in vehicles).

SUMMARY OF THE INVENTION

The present invention comprises devices and methods of use to rapidly respond in emergency situations. The present invention primarily comprises a main device designated as the Portable Emergency Messenger System (PEMS) (or PERS or AERS), 1) for use alone by an individual as a form of Personal protection (e.g. "mini-EMS™"), and/or 2) for use in conjunction with additional devices of the present invention to protect the safety of occupants within a closed vehicle. Different PEMS's may comprise different features tailored to the specific intended use of the device. For example, the mini-EMS comprises a camera to capture the image of potential assailants, while a PEMS for protecting the safety of children within a hot vehicle does not require this.

In one embodiment of the present invention the "mini-EMS™" is for a User to have on their person at all times, for example, as a key ring, as a necklace or as a wristband. It is primarily intended to deter harm to the user, such as to prevent abductions, but it may also serve to quickly locate the victim. For example, the mini-EMS serves to bridge the 72 hour waiting rule required by police prior to reporting an adult missing (unless overt evidence of a crime being committed). It thus allows a search to commence while evidence remains fresh by providing the GPS coordinates of the victim, as well as photographs and voice recordings of the victim's assailant in real time. In a preferred embodiment, the device has the ability to transmit photographs as a MMS/text message attachment via a mere activation of the EMS button. It also functions as a mobile phone with two way conversations with EMS personnel.

The mini-EMS™ device comprises the following: EMS button; GPS; GSM-Quad 4; GPRS; Microphone; Speaker; Rechargeable Battery; Solar Panel; and USB port. The device may or may not also comprise a camera. Upon depressing the EMS Button, the camera, GPS, GSM, GPRS, and voice monitoring are activated; and four SMS/MMS messages are transmitted with SMS/MMS/GPS to the Center and three messages to the User's pre-designated contacts. SMS's will continue to be transmitted until the Emergency Response Center ("Center") or one of the contacts call the tracker. Activation is only terminated when the User calls the tracker and enters their PIN number, or when the Center calls the User and requests and receives the User's password. When the battery power is less than a pre-designated level, such as 30%, then the mini-EMS™ device transmits an SMS reminder to the User and to the Center reminding them to charge the battery.

Like the mini-EMS™, the PEMS may also be used in any situation requiring an emergency call to rescue an individual, such as: kidnapping or missing; violent attack—mugging, sexual assault; home invasion; fire; lost or stranded; etc. . . . . It comprises an oval head section attached to a base section, wherein the base section is plugged into the vehicle's power accessory outlet. The head section comprises a power button that when depressed activates GPS tracking. The head section may be detached from the base, such as when the driver grabs it when quickly exiting a vehicle. By activating the PEMS, the User's GPS location via SMS is transmitted to emergency responders that the individual has pre-designated: friends and family, a 24/7 manned help Center, etc. . . . . The PEMS is activated when alarms are breached or triggered within the following: the ChildMinder™, the ChildAlert™, the PetSafe™, the crime victim alarm, the shock/impact sensor—MEMS accelerometer, and the air bag deployment sensor.

In a preferred embodiment of the present invention, the PEMS may function as a monitoring device for the safety of the occupants of a vehicle, wherein the components and functions of the PEMS comprise one or more of the following: a voice system—speaker and microphone for one way, or two way conversations with EMS personnel such as in a mobile phone; a movement sensor (to measure vehicle inertia); a motion sensor (to detect movement by vehicle occupants); a shock/impact sensor (MEMS accelerometer to detect a vehicle collision); an air bag deployment sensor; a temperature sensor measuring the inside of the vehicle; a microcontroller or microprocessor unit; and a GPS/GPRS/RF/BLUE- TOOTH (Class 3, 1 mW, range≈5 meters) unit lacking a memory card to protect privacy.

The PEMS device may also be used in combination with additional devices of the present invention as a system to protect the safety of occupants of a vehicle (See FIG. 4). The PEMS device may be in "standby, sleep, activated, and armed" modes, wherein the armed mode requires the driver to manually arm the system, such as by pressing a power button on the driver's key fob. Additionally, or alternatively, the system may automatically arm when designated conditions are met. The control module (CM) within the head section of the PEMS may simultaneously communicate with a variety of radio frequency (RF) transmitters that monitor occupants within a vehicle. For example, the PEMS system may communicate with three child chest clips, or with a child chest clip and a pet tag, etc. . . . . . The PEMS system is "activated" generally when one of the RF transmitters comes within a designated range of the CM (e.g. about 2 meters); and the system is "armed" to sound various alarms when the system is activated and designated conditions are met (e.g. infant is locked in car seat with the chest clip closed, and the driver exits the vehicle and walks further than about 4 meters from the CM).

The PEMS device may be combined with the ChildMinder™ System to detect the presence of a child (or infant) within a vehicle, such as in a car safety seat, under various conditions for the purpose of protecting the child from accidently abandoned in a vehicle and alerting the caregiver, especially on a hot day; and to detect the child getting out of the car seat unsupervised, such as when the vehicle is in motion. The system may also take corrective action to mitigate the danger, such as automatically rolling down vehicle windows, and automatically locking vehicle doors. The ChildMinder™ System of the present invention comprises the following components: a chest harness clip on the car safety seat (or attached to the vehicle seat belt) acting as a radio frequency transmitter to the CM and to the key unit; a pressure sensor pad acting as a radio frequency transmitter to the CM and key unit; a key unit (i.e. fob) acting as a radio transceiver from the CM; a universal vehicle device that automatically controls window roll up/down, and optionally— vehicle horn activation, vehicle headlight flashing, and/or airbag activation via acting as a radio transceiver from the CM and key unit; and a software application for mobile communication devices for activating an emergency call list.

The PEMS device may also be used in combination with a Child Alert™ System to warn against children playing in a vehicle and accidentally getting locked inside, especially on hot days. The system may also take corrective action to mitigate the danger, such as automatically rolling down vehicle windows, and unlocking vehicle doors and the trunk. The Child Alert™ System of the present invention comprises the following components: a universal vehicle device that automatically controls window roll up/down, and optionally— vehicle horn activation, vehicle headlight flashing, and/or airbag activation via acting as a radio transceiver from the CM and key unit; and a software application for mobile communication devices for activating an emergency call list.

The PEMS device may also be used in combination with a PetSafe™ System to warn against pets left in a vehicle unattended, especially on hot days; and to warn of pets located outside of a vehicle that are at risk of being run over. The system may also take corrective action to mitigate the danger of pets being locked in a hot vehicle, such as automatically rolling down vehicle windows. The PetSafe™ System of the present invention comprises the following components: a pet tag acting as a radio frequency transmitter to the CM; a universal vehicle device that automatically controls window roll up/down, and optionally—vehicle horn activation, vehicle headlight flashing via acting as a radio transceiver from the CM and key unit; and a software application for mobile communication devices for activating an emergency call list.

The systems of the present invention trigger various alarms when the PEMS device is armed and RF transmitters indicate that dangerous preconditions are met. Alarms of the present invention may comprise: audible alarms emitting from driver's key fob; voice messages emitting from the CM indicating danger (e.g. "Child not safe"); and/or actions to take to ensure their safety and the safety of the vehicle occupants (e.g. "Get out of the car"); automated voice messages to mobile devices; repeated text messages (SMS) to the driver's and emergency contacts at designated intervals (e.g. 2 minutes) until the system is disarmed; vehicle horn repeatedly sounding; and vehicle headlights flashing.

The devices within the system of the present invention are primarily self-powered. Their sensors are short range (i.e. about 2-4 meters), low power radio frequency transmitters and/or transceivers with a battery life of about 1-4 years. For example, the infant car seat chest clip and pressure sensor pad and the pet sensor tag have about a 2 meter range and a battery life of about 3-4 years; while the key fob has about a 4 meter range and a battery life of about 1 year. Additionally, the PEMS device of the present invention comprises a battery with a 4-day charge, and wherein a message (email, text, IM . . . ) is sent to the User and/or the Emergency Response Center when the battery is low and needs to be recharged. It may be recharged while plugged into the vehicle's accessory power outlet, or when plugged into a USB/universal power-in port on a computer or electrical outlet. The PEMS's head unit comprises a micro LCD graphic display showing a GIF spinning Earth graphic to indicate that the unit is charging, as well as a change in power source level sensor. It may also be equipped with a solar panel to afford continuous charge of the battery, as in the mini-EMS. When the device is detached from the vehicle's accessory power outlet for use as a person emergency messenger system (i.e. stored in the User's purse), then the device is powered off until activated in emergency situations by depressing the power EMS button on the device.

The PEMS device of the present invention also maintains the privacy of the User as to their current location and history of travel. While current GPS systems have caused privacy concerns due to the storage of a User's movements, the device of the present invention lacks a memory card to record movements. It can also not be remotely powered on to determine a User's current location. Only the User can activate the device.

The PEMS devices of the present invention are also portable by being: compact, lightweight, and supplied by power from a long life battery and/or an accessory power outlet (i.e. vehicle cigarette lighter). It may be used in rental vehicles, loaner vehicles, switched between family vehicles, etc. . . . . In an alternative embodiment of the present invention, the PEMS device may be permanently installed, such as in a vehicle accessory power outlet.

The present invention further comprises a computer program product, such as an application for a mobile communications device with Bluetooth technology, for use with both the "mini"-EMS system and the PEMS system. The application enables the mobile to auto-connect to the CM when it comes within the CM's range if the system is already activated and if the Bluetooth is enabled on the mobile. The application will also override all other Bluetooth paired device connection protocols currently active on the mobile so as to enable the driver to immediately transmit SMS messages to the Center and/or to the driver's emergency contact list conveying the driver's GPS location.

The present invention may also comprise means to roll up or down the vehicle windows as needed; flash automobile lights; sound car horns; send an SMS message to the driver; etc. . . . . Devices may comprise, for example, the Power Window Roll Up Closer and horn Module for Car alarm 4 Door Full manufactured by, for example Baby Alert International with 1) an automatic window roll up/down module; 2) an automatic door lock and unlock module; and 3) able to be hooked up to the existing car alarm or keyless entry system.

BRIEF DESCRIPTION OF THE DRAWINGS

In the accompanying drawings, which illustrate an exemplary embodiment of the present invention.

DETAILED DESCRIPTION OF THE INVENTION

The following definitions and methods are provided to better define the present invention and to guide those of ordinary skill in the art in the practice of the present invention. Unless otherwise noted, terms are to be understood according to conventional usage by those of ordinary skill in the relevant art.

As used herein, the term "GPS; GSM-Quad 4; GPRS" refers to, respectively, a global positioning system (GPS); global system for mobile communication supporting four radio frequency bands (GSM-Quad 4); General Packet Radio Service (GPRS) is a mobile data service that provides data transfer at rates ranging from 56 to 114 kilobits per second (Kbps)—(e.g. used for mobile internet access).

As used herein, the term "vehicle" refers to an enclosed car, automobile, etc. . . . comprising an accessory power outlet, wherein said vehicle may pose a safety treat to individuals and pets locked inside, especially under hot weather conditions.

As used herein, the term "Center" refers to the Emergency Response Center (ERC) that the system will automatically contact via SMS in emergency situations with the driver's GPS coordinates. The Center may be a private security company (e.g. OnStar like) or it may refer to a 911 call center. The ERC may subsequently notify emergency first responders and the driver's pre-designated emergency contact list (family/friends). The ERC may also comprise electronic communications devices with the ability to remotely unlock the driver's side door on the vehicle. For example, the ERC may call the CM, then enter a code that will trigger the CM to transmit a RF signal to RF transceivers so as to lock and unlock vehicle doors, and/or to roll windows up and/or down.

The present invention is a multi-purpose security system comprising one or more of the following four integrated security monitoring and alarm systems: Personal Emergency Response System PEMS alone for individual safety (i.e. the "mini EMS™" device); and/or the PEMS combined with the ChildMinder™ System; and/or the Child Alert™ System; and/or the PetSafe™ System for use in a vehicle. The alarm systems of the present invention therefore comprise the PEMS in use alone for personal safety, and/or in communication with one or more low power radio frequency sensors located within a short range (e.g. 2-4 meters) of the PEMS for the safety of individuals and pets within a parked and a moving vehicle.

Mini-EMS™ for Personal Safety

Figure 1:
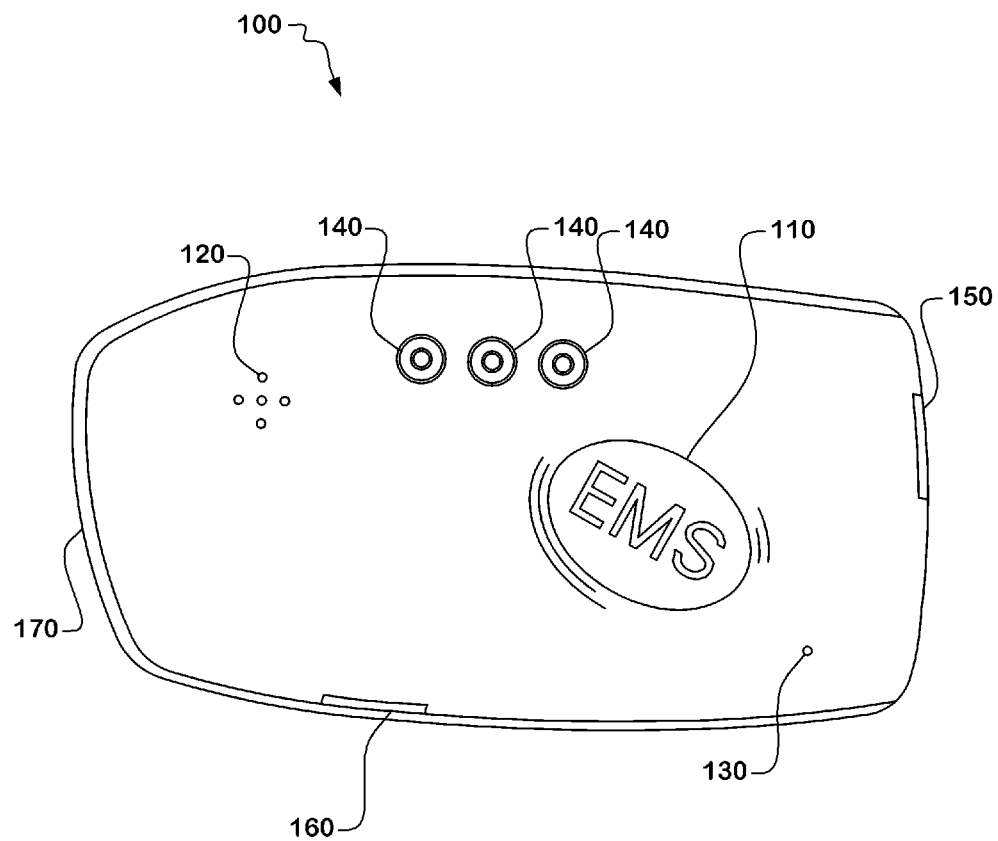
FIG. 1 illustrates the "Mini-EMS™" device of the present invention

In one embodiment of the present invention, the PEMS device, otherwise known as the "Mini-EMS™" device 100 comprises the following electrical circuitry and hardware components of: "EMS" button (see FIG. 1, item 110); a speaker 120; a microphone 130; a GPS, GSM-Quad 4, GPRS 140; a USB port 150 to recharge the battery; a GSM SIM slot 160; and a camera 170; and. In a preferred embodiment, the device is primarily rectangular shaped as illustrated in FIG. 1, wherein the device's dimensions are approximately: 9 mm*35 mm*64 mm. The device can also be used as a key fob, or suspended around the User's neck or wrist. The camera 170 is on the back top center of the device, and in an alternative embodiment of the mini-EMS™ there is no camera. The three recessed LEDs 140 indicate power on, GSM, GPS. The back panel on the unit is a solar panel. The present invention is not limited to this specific embodiment, wherein one of ordinary skill in the art could readily design other embodiments, such as incorporating it into a wristwatch, and/or moving the components, such as moving the sensors 140 to the end of the device and opposing the EMS button.

The "Mini-EMS™" device, also known as the "Mini-PER™" device of the present invention may be setup such that when the User depresses the EMS Button, it activates the camera, GPS, GSM, GPRS, and voice monitoring system. One SMS/MMS message is transmitted with SMS/MMS/GPS to the Emergency Response Center ("Center"). In police districts that support 911 calls via SMS (e.g. areas of the United Kingdom), the SMS to the Center may be a message directly to the police. The device will concurrently send SMS/MMS messages to three members listed on the User's emergency contact list. The device may also be enabled to periodically send SMS/MMS messages until the system is de-activated. The only way to de-activate the device once the "EMS" button is depressed is via: 1) the User calling the GPS tracker and entering their PIN; or 2) the Center calling the User on their mobile communications device and the User correctly stating their password. When the battery power is less than a pre-designated level, such as 30%, then the mini-EMS™ device transmits an SMS reminder once every twenty-four hours to the User and to the Center reminding them to charge the battery.

Exemplification 1: Mini-EMS™—Attempted Abduction

A User, who is attacked while walking with the mini-EMS hidden in their palm, surreptitiously activates the device by depressing the "EMS" button on the mini-EMS device. This wirelessly transmits an emergency SMS/MMS message to the Center and to the 3 entities on the User's contact list, wherein the message comprises the GPS coordinates of the User. If the User is physically abducted, the device will continue to send their updated GPS coordinates. Individuals on the Users' contact list may now monitor for any background noises of foul play. The assailant is also unable to turn off the GPS tracker if they discover it on the User, and the User refuses to provide them their PIN or password.

PEMS for Vehicle Passenger Safety

Figure 2:
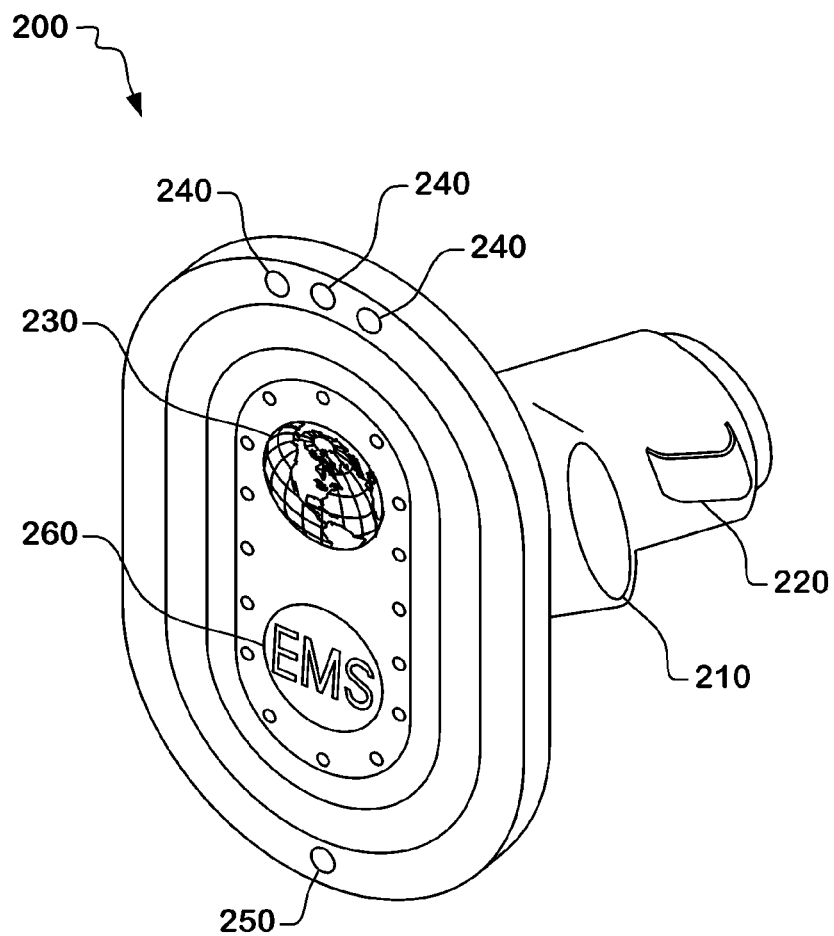
FIG. 2 illustrates the PEMS for monitoring safety of occupants of a vehicle.

As illustrated in FIG. 2, the PEMS 200 of the present invention comprises two main parts: 1) a head unit (i.e. the control module (CM)) with a male folding USB connector; and 2) a USB female power adapter system. Midway on the head unit lays a GSM SIMS reader (push in). The PEMS control module (CM) comprises electrical circuitry and hardware components for: a USB power adapter microphone 210; an apparatus for receiving direct power from the vehicle's power accessory outlet 220; a micro LCD rotating globe power indicator 230, wherein blue indicates the PEMS is drawing power from the vehicle, and red indicates it is self-powered; a PEMS speaker 240; a PEMS microphone 250; and the "On" or "EMS" button 260 to power the CM on when it is in the sleep mode, and to arm the system. The PEMS further comprises: a Movement Sensor (Vehicle Inertia); a Motion Sensor (Interior); a Shock/Impact Sensor (MEMS accelerometer); a Temperature Sensor; a replaceable/rechargeable Battery (4-day charge); an outlet for recharging via USB/universal power-in port (to a computer or electrical outlet). a microcontroller or microprocessor device; a GPS/GPRS/RF/BLUETOOTH (Class 3, 1 mW, range≈5 meters). The change in the power source level sensor 230 requires the device have the ability to recognize if it is drawing power from vehicle accessory port, or if it has been detached from the base and drawing power from battery, or if being recharged at an electrical outlet or computer. The PEMS may also comprise a low frequency 406 MHz RF module for Search and Rescue (SAR) that is similar to a GPS unit. It is activated upon depression of the "EMS" or "On" button. This would allow the PEMS to be used in remote outdoor activities, such as camping, hiking, etc. . . . .

Driver Key Fob

The systems of the present invention rely on a portable transceiver carried by the driver and in communication with the PEMS control module (CM). In a preferred embodiment, the transceiver is a key fob housing a short range very low power RF transmitter (less than about 4 meters), with a battery having 1-2 years of power, and utilizing Bluetooth technology. The transceiver must be manually powered on (i.e. depressing button) in order to arm the CM; and it is powered off by the CM when the system disarms—i.e. when chest clip on the car safety seat is opened while being less than about 2 meters from the CM. The CM can issue a voice message when the key fob is powered on, such as "System Armed", and when it is powered off, such as "System Disarmed". If the system is not disarmed when the key fob moves out of its transmission range (i.e. greater than about 4 meters from the CM, such as when the driver has exited the vehicle and is walking away), then the CM triggers the key fob's audible alarm, such as a ringing, buzzing, beeping, siren sound, and/or voice message emitted from the fob. If the driver returns within the key fob's transmission range (i.e. less than about 4 meters) within 5 seconds, then the system will disarm and the key fob audio alert will cease. If the driver does not return, then various alarm systems will trigger, such as key fob buzzing, SMS message to driver's mobile and the emergency contacts, vehicle horn sounding and headlights flashing, etc. . . . (see Exemplification 2 infra).

In an alternative embodiment of the present invention, the driver may possess a very low power Zigbee transceiver (versus Bluetooth technology) housed in a portable device, such as a key fob. The device would thus be in sleep mode until it comes with about 4 meters of the CM, wherein it would auto-connect and auto-activate with the CM and other RF transmitters (i.e. PetSafe™ and ChildMinder™).

Mobile Communications Device and Software Application

The present invention may further comprise the use of a mobile communications device for the driver to receive alerts from the CM in addition to alerts and alarms triggered on the driver's key fob. As exemplified infra, the CM can send SMS and automated voice messages to the driver's mobile.

The present invention further comprises a computer program product, such as an application for a mobile communications device with Bluetooth technology. The application enables the mobile to auto-connect to the CM when it comes within the CM's range (i.e. less than about 4 meters) if the system is already activated (i.e. by the key fob) and if the Bluetooth is enabled on the mobile. The application will also override all other Bluetooth paired device connection protocols currently active on the mobile so as to enable the driver to immediately transmit SMS messages to the Center and/or to the driver's emergency contact list conveying the driver's GPS location. The mobile application may be used with both the "mini EMS" system and the PEMS system to automatically transmit SMS/MMS messages from the mobile device to emergency responders.

GPS/GPRS/RF/BLUETOOTH: (Class 3, 1 mW, range≈5 meters). The PEMS GPS function is activated when: 1) the SOS button is pressed; or 2) when the control module (CM) is in the alarm state (wherein the tracker sends SMS message with GPS location to members of the contact list); or 3) when the CM head is removed from the base power supply that connects to the vehicle accessory power port; or 4) when the CM entire unit is disconnected from the vehicle power supply while the chest clip or pet tag is connected via RF to CM.

The "EMS" BUTTON—PEMS is activated from sleep mode by manually depressing the emergency "EMS" button of the CM (See FIG. 2, 260). For example, the driver would activate the system in the event of being involved in an vehicle accident wherein physical injuries are not sustained or the vehicle is disabled; when the vehicle has a mechanical breakdown or flattened tire; when the driver has a medical emergency, such as onset of a stroke; and/or when the driver is a potential victim of a crime (i.e. attempted car hijacking).

ChildMinder™ System

Figure 3:
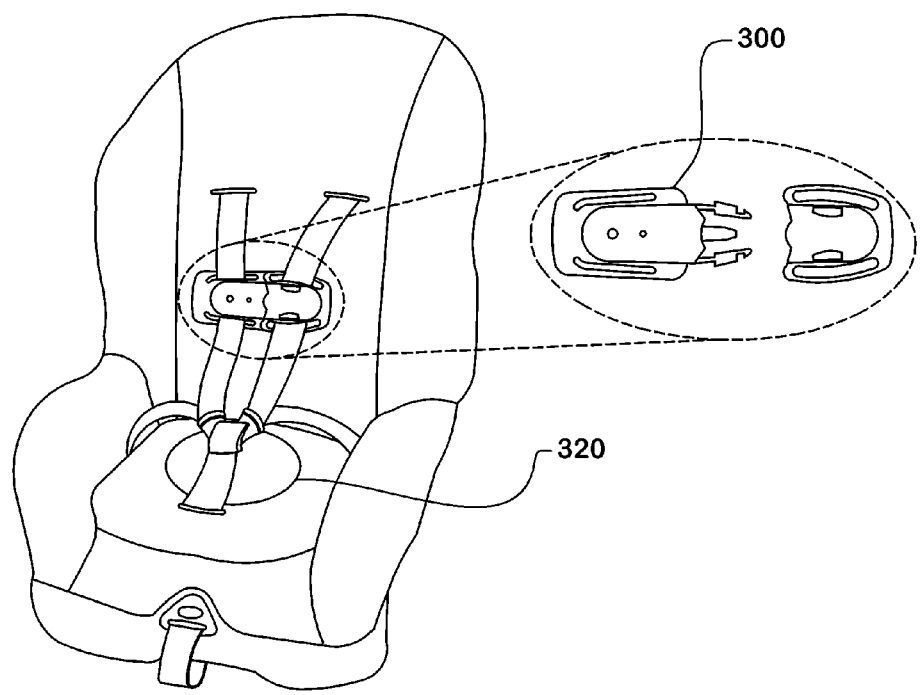
FIG. 3 illustrates the ChildMinder™ chest clip and pressure pad sensors.
Figure 4:
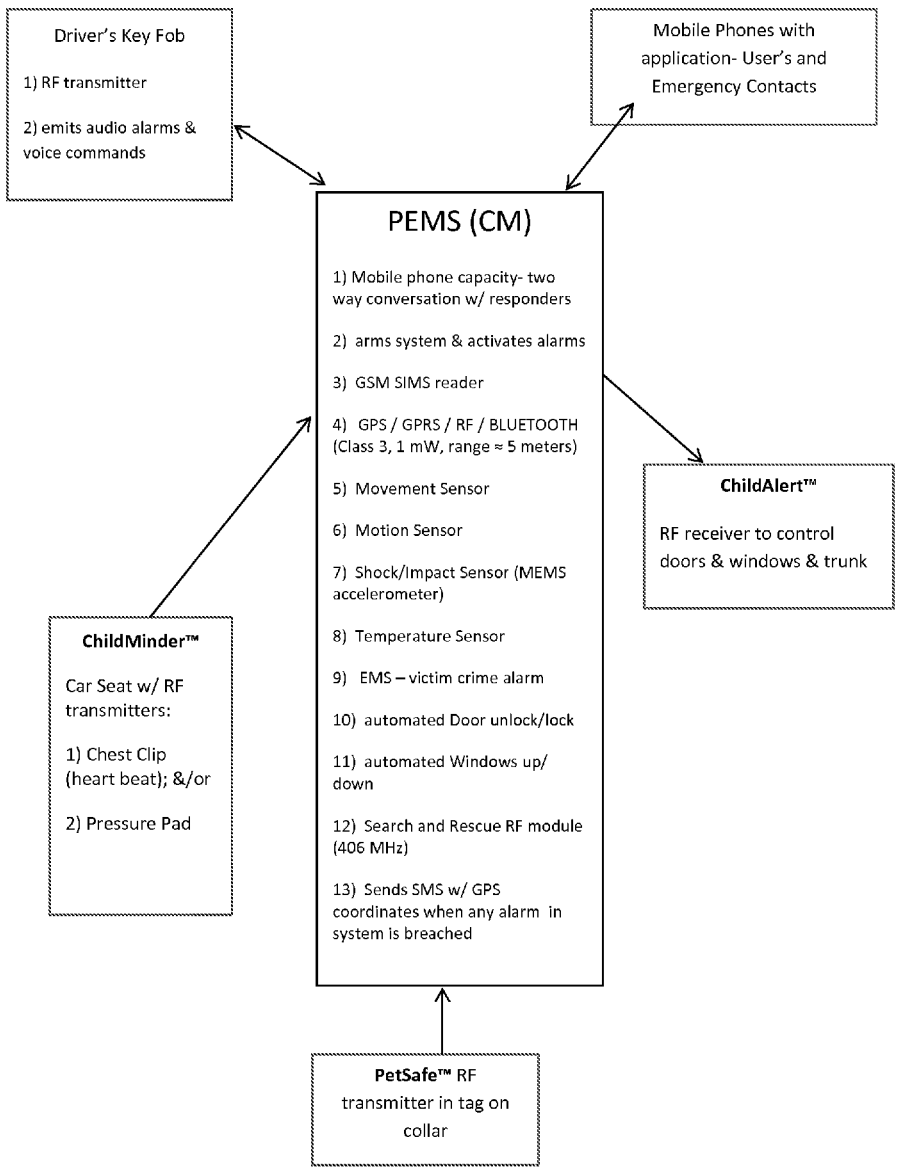
FIG. 4 is a schematic diagram of the present invention showing the PEM control module in communication with the ChildMinder™ device, the ChildAlertᴜ device, the PetSafe™ device, and driver's key fob and mobile phone.

Child Seat Sensors: As illustrated in FIG. 3, the present invention may also comprise the child/infant safety seat for a vehicle comprising sensors to detect: 1) the presence of a child/infant in the car seat; and/or 2) the movement of the child/infant within and out of the car seat. The primary sensor is the "chest clip" sensor (FIG. 3, item 300), which comprises a heartbeat monitor and/or a motion sensor attached to the seatbelt. The chest clip sensor is short range (about 2 meters), very low power RF transmitter or transceiver (SRD), with a battery life of about 3-4 years. It may also comprise LED indicator lights, wherein "Red" indicates that the system is activated, and "Green" indicates that the system is armed. It also transmits two RF messages: 1) "X"=means the chest clip sensor is within 2 meters of the vehicle PEMS, such as car seat is within the car; and 2) "Y"=means the chest clip is closed, such as the child/infant is in the seat. See Table 1 for possible voice messages from the PEMS to the driver based on the status of the chest clip sensors.

TABLE 1

| Sensor B Possible Messages/PEMS CM States | |
|---|---|
| 1. | X |
| 2. | XY |
| 3. | X to 0 |
| 4. | XY to 0/voice message "Activated" |
| 5. | XY to 0/voice message "Armed" |
| 6. | X to XY/voice message "No Movement" |
| 7. | X to XY/voice message "Movement" |
| 8. | XY to X/voice message "No Movement, Activated" |
| 9. | XY to X/voice message "No Movement, Armed" |

TABLE 1-continued

Sensor B Possible Messages/PEMS CM States

| | |
|---|---|
| 10. | XY to X/voice message "Movement, Activated" |
| 11. | XY to X/voice message "Movement, Armed" |

Notes:
0 = Exit Vehicle, Moves Out of Range > 2 meters
X = infant seat in range < 2 meters
Y = chest clip closed- child in seat The ChildMinder™ System may also comprise a "pressure pad" sensor (See FIG. 3, 320) as a default sensor, or as an additional sensor, or as an alternative sensor to the chest clip sensor. The pressure pad sensor is short range (about 2 meters), very low power RF transmitter or transceiver (SRD), with a battery life of about 3-4 years. It also transmits two RF messages: 1) "V" means the pressure sensor is within about 2 meters of the vehicle; and 2) "W" means the pressure sensor detects the weight of an occupant in seat. See Table 2 for possible voice messages from the PEMS to the driver based on the status of the pressure pad sensors.

TABLE 2

Sensor A Possible States/B, CM States

| | |
|---|---|
| 1. | V |
| 2. | VW/voice message "Activated" "Armed" |
| 3. | VWX activates, arms, alert to fasten clip |
| 4. | VWXY activates, arms |
| 5. | VX |
| 6. | VXY |
| 7. | V, VX, or VXY to 0 |
| 8. | VW, VWX, VWXY to 0/Activated |
| 9. | VW, VWX, VWXY to 0/Armed |
| 10. | V to VW/No Movement |
| 11. | V to VW/Movement |
| 12. | VW to V/No Movement, Activated |
| 13. | VW to V/No Movement, Armed |
| 14. | VW to V/Movement, Activated |
| 15. | VW to V/Movement, Armed |

Exemplification 2—Infant Left in Car Seat

When an infant or small child is sitting in their car seat within the vehicle with their chest clip closed, then the chest clip RF sensor and/or the pressure pad sensor in the infant seat send a message to the CM, which is plugged into the accessory power outlet at a distance of less than 2 meters. This will arm the PEMS device, so that if the driver subsequently parks and exits the vehicle without deactivating the system, then alarms will be triggered once they are at least about 4 meters from the CM that is plugged into the vehicle's accessory power outlet. Specifically, if the driver did not deactivate the system by: 1) opening the chest clip on the child's harness; or 2) by taking the car seat with the infant locked within it further than 2 meters distance from the CM, then alarms will be triggered. Alarms may comprise one or more of the following: 1) the driver's mobile communications device and key fob unit buzz; 2) the CM sends a SMS and voice alarm message to the mobile device; 3) the CM sends an urgent SMS message to the entities designated on the driver's contact list; and 4) the CM transmits RF signals to activate the vehicle horn and flash the headlights. If the driver subsequently returns to the vehicle (i.e. moves within about 4 meters of the CM), then the alarms will cease, wherein: 1) the mobile device and key fob stop buzzing; 2) the CM sends a SMS message "Baby Safe" to the contact list; and 3) the CM transmits a RF signal to stop the vehicle horn and flashing lights.

Exemplification 3: Vehicle in Motion and Child Climbs Out of Seat

The ChildMinder™ system also has the ability to trigger alarms when the parent is distracted driving the vehicle, and the child climbs out of their car seat. The system is armed when the car seat is within about 2 meters of the CM (i.e. parent places car seat within vehicle), and the chest clip is closed, and/or the pressure sensor in the car seat detects the weight of a child occupant. Once armed, alarms will activate if the system then detects that the chest clip is opened and/or that there is a marked decrease on the pressure pad sensor. Note: the system does not require that the parent's key fob or mobile phone be greater than 4 meters distance from the CM to activate the alarms. Alarms comprise the CM buzzing and emitting a voice message "CRS not secure". Once the child returns to the car seat and the chest clip harness is re-closed and/or the pressure pad detects the child's weight, then the CM will stop buzzing, and it will emit a voice message "CRS secure, thank you".

Exemplification 4: Vehicle Parked; Temperature>30 Degree Celsius

The ChildMinder™ System will also trigger alarms if the child is locked within their car seat in a parked vehicle when the temperature reaches an unsafe level, whether or not the parent is within the vehicle. Alarms will trigger if the following conditions are meet: 1) the child is locked in the chest clip harness while seated in the car while the car seat is within 2 meters of the CM (as detected by the chest clip being closed, and/or the pressure pad sensor detecting the child's weight); and, 2) the temperature in the car reaches unsafe, pre-designated levels (e.g. 30 degrees Celsius). The distance of driver's key fob or mobile phone from the CM will not affect the ability system. Alarms comprise the CM sending a SMS message to the emergency contact list and the parent's mobile device stating, such as "Baby Urgent"; the key fob and mobile device buzzing; and the CM sending RF messages to the vehicle's onboard security alarm system to roll down the windows, sound the horn and flash the headlights.

In order to stop the alarms, the temperature must drop below a pre-designated safe level, such as 27 degrees Celsius. The CM will transmit a SMS message to the parent's mobile device and the emergency contacts stating, such as "Baby not safe"; the key fob and mobile device will stop buzzing; the CM will transmit a RF signal to the vehicle's onboard security system to roll up the car windows and stop the car horn; and then the CM will power down into a standby mode.

Alternatively, the parent can remove the child from the car seat to stop the alarms. When the CM detects that after the alarms triggered, the chest clip was opened or the pressure pad sensor no longer detects the child's weight, then the CM will transmit an SMS to the contact list stating "Baby Safe". The CM will also transmit an RF signal to the key fob to power off or enter sleep mode; it will terminate its Bluetooth connection with the mobile phone; and it will transmit a RF signal to the vehicle's onboard security alarm system to roll up the windows, stop the horn and flashing headlights. Only then will the CM will enter into standby mode.

In order to stop the alarms, the parent can remove the car seat with the child secured within it to a distance more than 2 meters from the CM. The distance of the key fob and/or mobile phone will not affect the alarms. Once the occupied car seat is more than 2 meters, the CM will transmit a SMS to the contact list stating "Baby Safe"; it will send an RF message to the key fob causing it to power off or enter sleep mode; it will send a message to the mobile phone to stop connecting to the CM; and it will transmit an RF signal to the vehicle's onboard security system to roll up the windows, cease sounding the horn and flashing the lights. Then the CM will enter standby mode.

Exemplification 5—Vehicle Parked or Vehicle in Motion; CM Armed or Not Armed

The PEMS control module (CM) can act as an emergency assistance device alone, and without being in communications with the ChildMinder™, ChildAlert™, or PetSafe™ devices. It also need not be connected to its base and/or plugged into the vehicle accessory power outlet. If, for example, an driver grabs the CM head in an emergency situation (attempted kidnapping) while leaving the CM base plugged into the vehicle accessory power outlet, or if s/he detaches the whole CM from the power outlet, then the system will transmit SMS messages with the driver's GPS coordinates to the Center and three of the driver's emergency contacts. If the driver moves beyond about 4 meters distance from the RF sensors in the child car seat (chest clip and pressure pad), then the CM will transmit a signal to the vehicle's onboard alarm system to trigger the horn and flash the headlights in addition to sending the Urgent SMS's. The only way to de-activate the alarms and reset the CM, is via: 1) the User calling the GPS tracker and entering their PIN; or 2) the Center calling the User on their mobile communications device (or via the CM) and the User correctly stating their password.

Exemplification 6—Sudden Movement of Vehicle or Air Bag Deployment

The PEMS can also determine if a vehicle has been in a collision, and distinguish between accidents that trigger the accelerometer and/or that deploy the vehicle air bag. The CM will then transmit an "Urgent" SMS to the Center and the driver's contact list with their GPS location indicating the type of collision that has occurred (i.e. accelerometer—minor accident, versus air bag deployment—potentially serious impact). The Center will then call the driver on the CM, and determine if medical/emergency responders are needed. If so, the Center will call 911 to report the accident and direct paramedics and police to the scene. The only way to de-activate the alarm (SMS alerts) and reset the CM, is via: 1) the driver calling the GPS tracker and entering their PIN; or 2) the Center calling the driver on their mobile communications device (or via the CM) and the User correctly stating their password; and/or 3) the driver receiving and responding to a call from a member of their contact list.

ChildAlert™ System

The present invention also comprises a system for alerting drivers when children have are playing in a parked vehicle, especially during hot temperatures. The control module of the PEMS comprises a temperature sensor and a motion sensor to detect when a child has entered a parked car. The control module also arms the system when the vehicle is parked for more than 30 minutes and the temperature is more than 33 degrees Celsius within the vehicle. If no motion is detected under these conditions, the system will lock the vehicle doors to prevent a child from getting into the vehicle. If motion is detected when these conditions occur, the doors and the vehicle trunk will unlock and the control module will generate a voice message to the occupants, such as "Get Out of the Car!".

Exemplification 7—Children Playing in Parked Car or Climbing in Trunk

A vehicle has been parked for more than 30 minutes and the temperature inside the vehicle has exceeded 34 degrees Celsius and the CM detects motion in the car and/or a heartbeat. The CM will transmit an emergency SMS message to the User's contact list, and it will transmit a signal to the vehicle onboard security system to roll down the windows, sound the horn, flash the lights, and pop the trunk. If the temperature inside the vehicle then falls below 30 degrees Celsius, then the CM will transmit a message to the vehicle security system to roll up the windows, and to cease sounding the horn and flashing the lights. The CM will also transmit a safe message to the contact list Likewise, the CM will also stop the alarms if it detects the car door opening in lieu of the temperature dropping.

PetSafe™ System

The present invention may also comprise a sensor within pet tag, such as a suspended from an animal collar, comprising a short range (about 2 meters), very low power RF transmitter or transceiver (SRD), with a battery life of about 3-4 years, and encased in a water resistant shell. In a preferred embodiment, the pet tag has dimensions of 30 mm*15 mm*5 mm. When the pet tag is less than about 2 meters from the CM of the PEMS, then the CM activates; and if greater than about 2 meters, then the CM deactivates. If a pet is left in a vehicle wherein the temperature exceeds a pre-designated safe level, then the system alerts the User via SMS text message; and/or may lower the vehicle windows to lower the temperature. The pet tag transmits one RF message—"Z" (see Table 3).

TABLE 3

| Sensor Pet/CM Conditions | |
|---|---|
| 1. | Z |
| 2. | Z to 0/Activated |
| 3. | Z to 0/Armed |

Note:
0 = Exit Vehicle, Moves Out of Rang; > 2 meters

Exemplification 8—Pet Left in Vehicle and Temperature Rises

When a pet wearing a tag of the present invention is placed in a vehicle within about 2 meters of the CM, then the CM will arm and issue a voice message "Occupied". If the temperature inside the vehicle then exceeds 29 degrees Celsius, the CM will transmit SMS to the driver's contact list stating "Pet in Danger"; and the CM will transmit a signal to the vehicle security system to sound the horn, roll down the windows, and flash the headlights. If the temperature subsequently falls below 27 degrees Celsius, or if the pet leaves the vehicle as detected by moving more than 2 meters from the CM, then the CM will deactivate the alarms, roll up the windows, and issue a voice message "Pet Safe".

Although the invention has been described in terms of certain preferred embodiments, other embodiments that are apparent to those of ordinary skill in the art, including embodiments which do not provide all of the features and advantages set forth herein, are also within the scope of this invention. Accordingly, the scope of the invention is defined by the claims.

What is claimed is:

1. A lightweight, portable emergency messenger system PEMS device for use in wirelessly contacting emergency responders comprising:
   a) a detachable control module head unit housing a communications and monitoring components separable from a base unit, comprising:
      1. i) a voice system comprising a speaker and a microphone to transmit automated audio alert messages to Users from said voice system, and one and/or two way conversations between Users and said emergency responders;

ii) a movement sensor with the ability to detect vehicle inertia;
iii) a motion sensor to detect movement of occupants within a vehicle;
iv) a MEMS accelerometer to detect if the vehicle is involved in a collision;
v) a Temperature Sensor to detect temperatures within a vehicle;
vi) a microcontroller or microprocessor device;
vii) a Global System for Mobile Communication Subscriber Identity Mobile (GSM SIMS) card reader;
viii) a global positioning system (GPS), a global system for mobile communications supporting four radio frequency bands (GSM—Quad 4), and general packet radio service (GPRS);
ix) a sensor to indicate a change in the type of power source and a means to detect the type of power source in current use by said system;
x) a means to activate said PEMS device to wirelessly transmit SMS/MMS messages comprising a User's global positioning system (GPS) coordinates and live audio feed of a User's situation to said emergency responders; and,
b) a base unit configured to plug into a vehicle accessory power outlet, comprising a
  i. rechargeable battery with the ability to provide about 96 hours of continuous power to said PEMS device, and the means to recharge said battery via USB port and via a power accessory outlet;
  ii. wherein said head unit is programmable to activate alarms and transmit SMS messages with the User's GPS coordinates to emergency responders if detached from the base unit after said device is armed, and is configured to monitor the safety of vehicle occupants within and outside the vehicle.

2. The PEMS device of claim 1, wherein the device lacks the ability to store the User's history of movement within a computer memory or to remotely activate said device by non-User entities.

3. The PEMS device of claim 1, wherein said device is deactivated when: 1) the User calls the GPS tracker and enters their PIN; or 2) said emergency responders call a User's mobile communications device and the User correctly states their password.

4. The PEMS device of claim 1, wherein said means to activate said PEMS device comprises a computer program product comprising non-transitory machine-readable medium storing machine instructions that, when executed by a User's mobile communications device comprising one or more programmable processors, cause the mobile device to perform functions comprising transmitting wireless communications between said mobile device and said emergency responders disclosing the User's GPS coordinates.

5. The PEMS device of claim 4, wherein said functions further comprise enabling said mobile device to auto-connect to an activated PEMS device when it comes within a range of about 4 meters of the PEMS device and if the Bluetooth is enabled on the mobile device.

6. The PEMS device of claim 1, further comprising a sensor and short range radio frequency transmitter to detect the presence and movement of a child/infant in a safety car seat, wherein said transmitter is incorporated into the harness of said seat and detects the heartbeat of said child/infant, and wherein said PEMS device is programmable to sound an alarm if the child/infant is left unattended in the vehicle.

7. The PEMS device of claim 1, further comprising a pressure sensor and a short range radio frequency transmitter within the safety car seat to detect the presence and movement of a child/infant; and wherein said device is programmable to emit an automated message from the voice system when the child/infant has climbed out of the car seat.

8. The PEMS device of claim 1, further comprising sensors to detect the entry of individuals into a parked vehicle with a temperature within the vehicle that is above a designated atmospheric temperature, that triggers an automated means to roll up or down the vehicle windows; to flash automobile lights; to sound car horns; to send audio and text messages to the emergency responders; and to lock/unlock vehicle doors and trunk.

9. The PEMS device of claim 1, further comprising sensors and short range radio frequency transmitters to detect the presence of a pet within a vehicle; and the means to 1) send SMS messages to a User when the temperature exceeds a safe level, and to 2) lower vehicle windows.

10. The PEMS device of claim 1, further comprising a key fob device comprising a short range very low power transmitter and power button wherein depressing said button arms said PEMS device.

11. The PEMS device of claim 10, wherein said PEMS device will trigger an audible alarm emitted from said key fob if the PEMS device is not disarmed when the key fob moves more than about 4 meters from said PEMS device.

* * * * *